(No Model.) 2 Sheets—Sheet 1.
W. B. VANSIZE.
ELECTRIC RAILWAY.
No. 461,969. Patented Oct. 27, 1891.
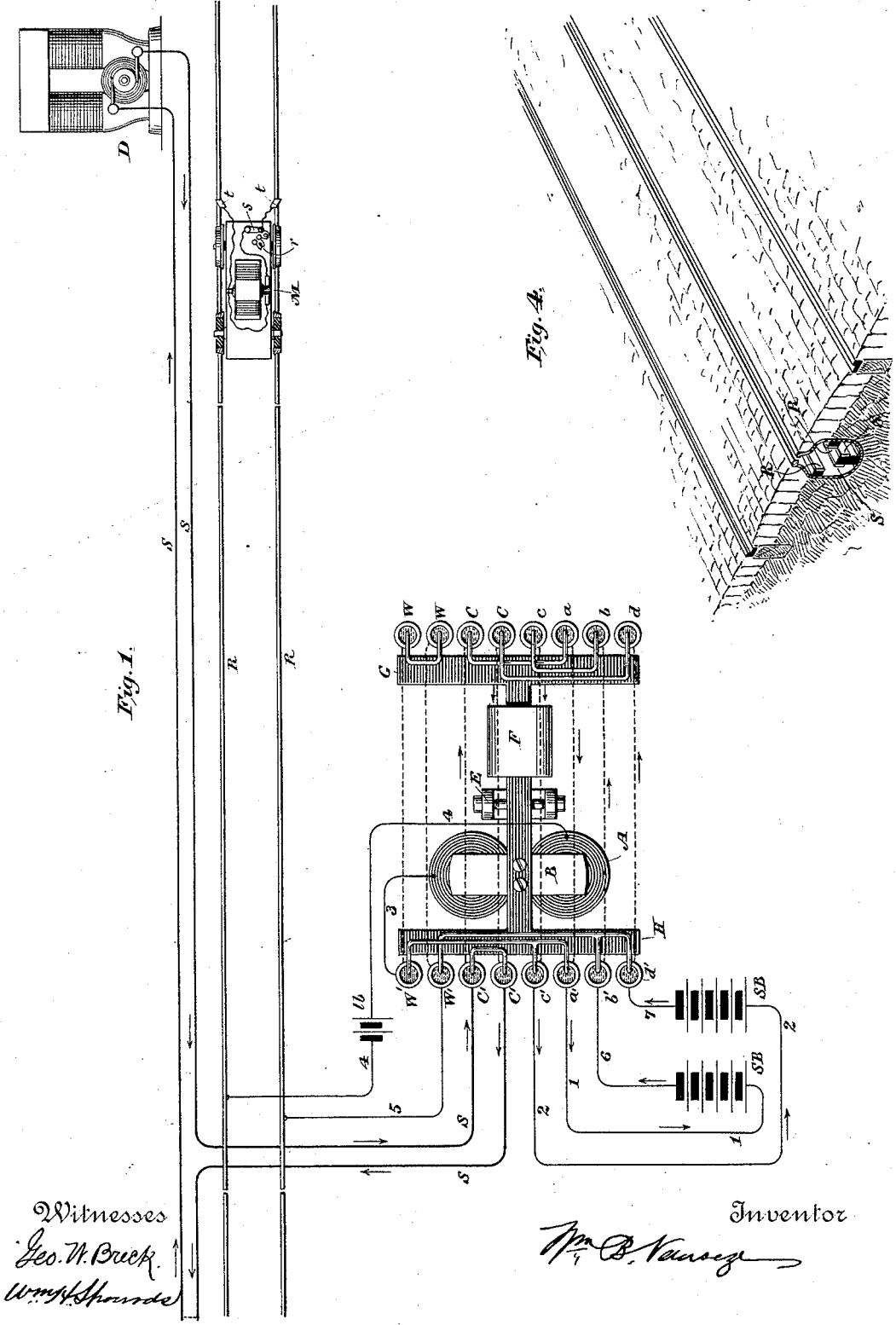
Witnesses
Geo. W. Breck.
Wm. H. Shounds
Inventor
Wm. B. Vansize (No Model.) 2 Sheets—Sheet 2.
W. B. VANSIZE.
ELECTRIC RAILWAY.
No. 461,969. Patented Oct. 27, 1891.
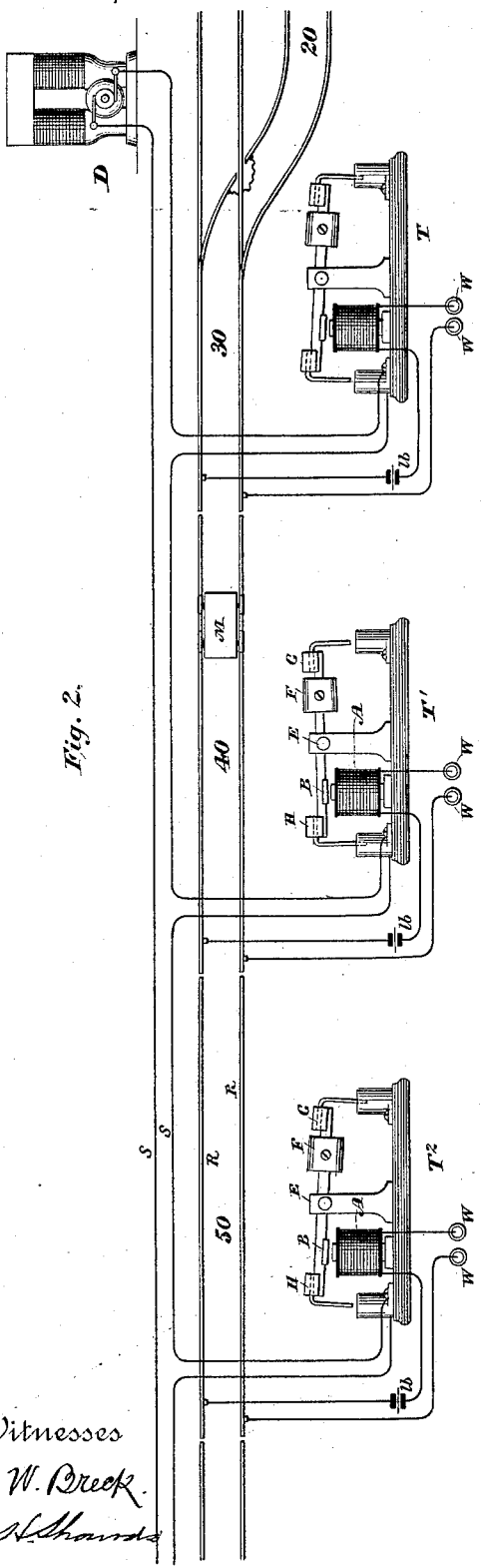
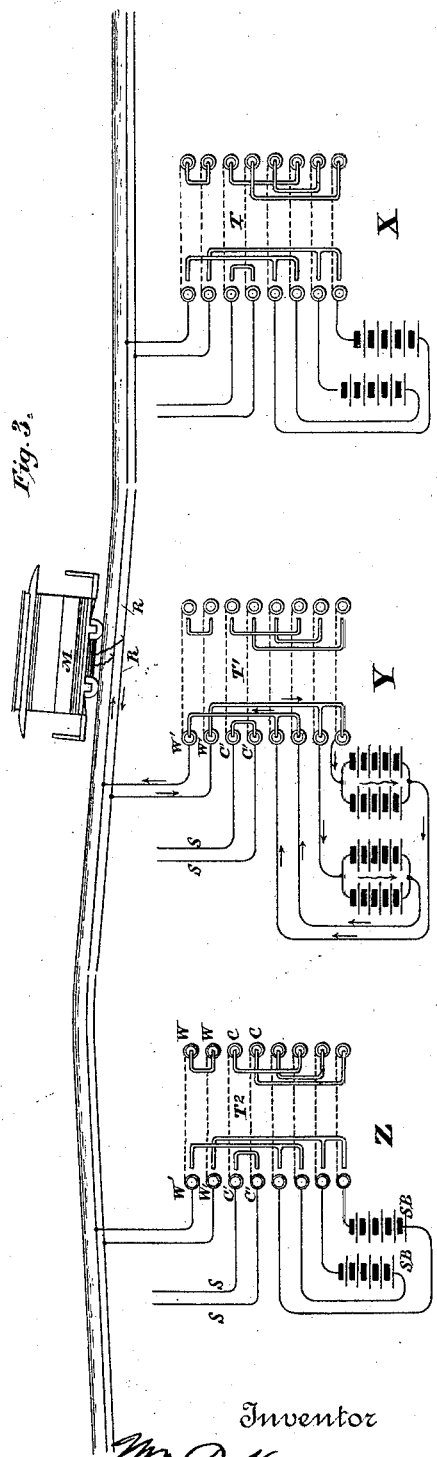
Witnesses
Geo. W. Breck
Wm H Shounds
Inventor
Wm B Vansize

UNITED STATES PATENT OFFICE.

WILLIAM BALDWIN VANSIZE, OF PLAINFIELD, NEW JERSEY.

ELECTRIC RAILWAY.

SPECIFICATION forming part of Letters Patent No. 461,969, dated October 27, 1891.

Application filed September 1, 1890. Serial No. 363,682. (No model.)

*To all whom it may concern:*

Be it known that I, WILLIAM BALDWIN VANSIZE, a citizen of the United States, and a resident of Plainfield, in the county of Union and State of New Jersey, have invented certain new and useful Improvements in Electric Railways, of which the following is a specification.

My invention is an improvement in electric railways.

The invention embodies the use of a vehicle carrying an electric motor by which it is propelled, a working conductor divided into a series of successive sections, means for maintaining electrical connection between the motor-terminals and the working conductor, a secondary battery located in close proximity to each section of the working conductor, a charging-circuit therefor, and suitable switching devices for transferring each section of the secondary battery from the charging-circuit to the sectional working circuit, near which it is located, and so on successively throughout the line of travel. The entrance of the car or vehicle onto any section of working conductor antomatically transfers the battery assigned to that particular section from the charging to the working circuit, and upon the car leaving such section the battery will be automatically returned to the charging-circuit. Any section of track having an upgrade is provided with an increased battery-power. A side track or switch is supplied from the same battery that supplies the section of main track, beside which such side track, switch, or turn-out is placed.

In practically applying my invention to railways now in existence I prefer to use the rails as the working conductor, dividing the track into successive sections of one-quarter or one-half mile, according to the amount of work required from the propelling-power on such section. I so arrange the switch for transferring the battery from one circuit to the other that the battery shall be connected into the charging-circuit in series and into the working circuit in multiple arc. By this means I can make use of a small-gage charging-wire carrying a comparatively high electro-motive force; but the electric current, when connected with the working conductor, is of low electro-motive force, practically harmless, and has small tendency to escape, even if the working conductors are but slightly insulated. This renders it practicable to use the rails for working conductors. If desired, both the working circuit and the charging-circuit may be placed in a conduit between the rails, or either may be so placed.

The accompanying drawings illustrate my invention.

Figure 1 is a plan view of the complete invention. Fig. 2 shows a switch, turn-out, or side track and presents a side view of the automatic electric switches. Fig. 3 shows the arrangement of increased battery-power for a section of track having an upgrade. Fig. 4 shows a plan for using separate sectional working conductors and locating said conductors, together with a charging-circuit, in an underground slotted conduit between the track-rails.

In Fig. 1, R R are the rails, divided into sections at intervals, successive sections being practically insulated from each other to provide for their employment as the sectional working conductors, although the working conductors may be arranged as shown in Fig. 4, where R R indicates a sectional working conductor located in a slotted conduit between the rails. S B is a number of cells of secondary battery, preferably arranged in two series, as shown. Such a battery is to be located in close proximity to each section of working conductor. I prefer to place the battery in the cellar of a house located on the street near the conductor-section, or it may be placed in the barn adjoining such house or in a building constructed for the purpose. I arrange branch conductors 4 and 5 from the section of working conductor to an electro-magnetic switch T near the battery. S is a line-wire connected with a dynamo-electric machine D, located at the central station. Branches from this circuit are also run to each battery, and are controlled by the switch T. This switch T is composed of a coarse-wire electro-magnet A. An armature B on a rocking lever is pivoted at E. The bar is retracted by a sliding weight F. Upon opposite ends of the armature-bar are insulating-strips, and in lines parallel with each insulating-bar are two series of fixed mercury-cups. The cups at one end of the bar are respectively electrically connected with the corresponding cups at the other end. At each end of the rock-bar are movable electrical contact-points, grouped substantially as shown. One set or group is arranged to connect the battery with the working conductor, the two equal series of cells being in multiple arc. The other set or group of contacts is arranged to connect the battery with the charging-circuit, the cells then being in series. This latter group is on the retracted end of the rock-bar, so that the battery is normally in the charging-circuit, and is only changed from the charging-circuit to the working circuit while a car is on the section of working-conductor with which it is associated. For this purpose the branch 4 5 of the working conductor R is provided with a local battery $lb$. A car carrying an electric motor M, having its terminals connected with trailing contacts $t$, enters upon a rail-section, the circuit through magnet A is completed, the armature B is attracted, the series of contacts at W C $c$ $a$ $b$ $d$ are broken, and the series of contacts at W' C' $c'$ $a'$ $b'$ $d'$ are made or completed. As soon as the car moves off the conductor-section the circuit is broken and the battery is returned to the charging-circuit.

In Fig. 2 I have shown three sections of track 30 40 50, having switches T T' T², the rails R being used as the working conductor, and a branch, switch, or side track is shown at 20. This branch track is electrically connected with the main-track section 30, near which or parallel and adjacent to which it is placed, and a car passing along on track-section 30 or on side track 20 would operate the electro-magnetic switch T and be operated by the battery assigned to track-section 30.

In Fig. 3 I have shown a side view of three sections of track and the three adjacent battery-stations X, Y, and Z. The grade of the road and track adjacent to station Y has a heavy rise, calling for increased propelling power or an increased consumption of electrical energy to ascend it. I therefore correspondingly increase the amount of battery located at Y to meet the requirements or demands. I have assumed that it requires a flow of current twice as great to ascend the grade at Y as to move on the level, as at X, and therefore the battery-power is doubled. If the consumption of current were three times as great, I should correspondingly increase the battery.

The operation is too clear to need further explanation. Normally the connections are as shown in Fig. 1 and at station Z in Fig. 4. All contacts on the magnet or left-hand end of the switch are open. Following the course indicated by the arrows, circuit is $via$ S C $a$ 1, battery 6 $b$ $c$ 2, battery 7 $d$ C to S. When a car enters upon the section of working conductor, circuit is $via$ motor M $t$ R 4 $lb$ 4, magnet A, 3, W, W, 5, R, and $t$. The magnet A is energized and tilts or rocks the armature-bar, thus breaking all the contacts on the retracted or right-hand end of the switch and completing all contacts on the magnet or attracted end of said switch. The contacts entering mercury-cups W W, complete the circuit of local battery $lb$, and they are made slightly longer than other contacts in the same line, as is well known in the art, so that in rocking the bar from one set of contacts to the other there will be little or no interruption to the circuit 4 5. The magnet having been energized and the bar rocked over from one set of contacts to the other, circuit passes $via$ R 4 $lb$ A 3 W', then in parallel circuit $via$ 2, 7 and $d'$ and $via$ 1 6, and $b'$ to W', to R, through the trailing contacts $t$, and motor M.

The length or extent of any section of working conductor should be controlled or regulated by the amount of travel and the grade of the particular portion of the track in question. If travel is heavy, the section should be shorter than if cars passed infrequently. So, in regard to grades, the working conductor on a heavy grade should be a shorter section than if the track were level, the object being to use or exhaust one section of battery as much as another and to use all so as to prevent overcharging or undercharging. The circumstances or conditions of each particular case must be known to properly determine this question of proportion. On the car or vehicle I have shown a motor M, having its terminals connected to trailing contacts $t$; but if the track is used for the working conductor the wheels on one side must be insulated from those on the other and the wheels may be used as motor-terminals and current-collectors. I have shown a switch $s$ for breaking the circuit through the motor, and a resistance $r$, controlled by switch $s$, to vary the electro-motive force in the motor-circuit, for while the electro-motive force of the battery at each and every section is designed to be alike there will be found some slight variations, which can be compensated for by the use of the resistance, and variations in speed of movement of the car can also be produced in the same way.

What I claim, and desire to secure by Letters Patent, is—

1. The combination, in an electric railway, of a moving car or vehicle, an electric motor located thereon, by means of which said car is propelled, a working conductor electrically divided into a series of sections, current-collecting devices in the car, connected to the terminals of the motor-circuit and moving in contact with the working conductor, a switch or circuit-changer in the motor-circuit on the car, a series of cells of secondary battery divided into groups, one group being located in proximity to each section of the working conductor, but normally electrically disconnected therefrom, a series of automatic switches, one for each section of conductor, for automatically connecting and disconnecting said section with the adjacent group of battery-cells during the passage of a car over said section only, a central station containing a dynamo-electric generator, and an insulated electrical conductor for connecting the several groups of battery with the dynamo, substantially as described.

2. The combination, in an electric railway, of a moving vehicle, an electric motor on the vehicle, by which it is propelled, a track laid upon a roadway or bed varying at different points or sections with respect to grade or level, a section of working conductor for each such track-section, a series of cells of secondary battery divided into groups, one group located adjacent to each such section, said cells in any group in number or capacity bearing substantially the same ratio to the cells in other groups that the energy required in traversing its adjacent section of track bears to the energy required in traversing the other sections of track, a series of automatic switches for each track-section for connecting and disconnecting said section with the adjacent group of battery-cells during the passage of the car over said section only, a central station containing a dynamo-electric generator, and an electrical conductor for connecting the several groups of battery with the dynamo, substantially as described.

Signed at New York, in the county of New York and State of New York, this 27th day of August, A. D. 1890.

WILLIAM BALDWIN VANSIZE.

Witnesses:
    JNO. R. WEEKS,
    V. E. SCHAUMBURG.